US008777518B2

(12) United States Patent
Coleman (10) Patent No.: US 8,777,518 B2
(45) Date of Patent: Jul. 15, 2014

(54) PIPE SUPPORT SYSTEM AND METHOD FOR USE IN UNDERGROUND PIPE RAMMING

(71) Applicant: MPC Bedrock Montana, LLC, Dillon, MT (US)

(72) Inventor: Michael J. Coleman, Dillon, MT (US)

(73) Assignee: MPC Bedrock Montana LLC, Dillon, MT (US)

( * ) Notice: Subject to any disclaimer, the term of this patent is extended or adjusted under 35 U.S.C. 154(b) by 0 days.

(21) Appl. No.: 13/863,099

(22) Filed: Apr. 15, 2013

(65) Prior Publication Data

US 2013/0221188 A1   Aug. 29, 2013

Related U.S. Application Data

(62) Division of application No. 12/655,889, filed on Jan. 8, 2010, now Pat. No. 8,439,604.

(60) Provisional application No. 61/204,601, filed on Jan. 8, 2009.

(51) Int. Cl.
*F16L 1/028* (2006.01)

(52) U.S. Cl.
USPC ............... 405/184; 405/184.4; 405/154.1

(58) Field of Classification Search
USPC .......... 405/154.1, 158, 174, 178, 184, 184.4; 248/49, 51, 357; 254/10 R, 2 C, 93 L; 29/281.1

See application file for complete search history.

(56) References Cited

U.S. PATENT DOCUMENTS

| 4,295,257 | A | * | 10/1981 | Strohs ........................... 29/240 |
| 4,871,034 | A | | 10/1989 | Schmidt |
| 5,505,270 | A | | 4/1996 | Wentworth |
| 6,227,311 | B1 | | 5/2001 | Osadchuk |
| 2003/0039509 | A1 | | 2/2003 | McIvor |
| 2006/0088384 | A1 | | 4/2006 | Putnam |

* cited by examiner

*Primary Examiner* — Sean Andrish
(74) *Attorney, Agent, or Firm* — Daniel J. Chalker (57) ABSTRACT

A skid for positioning a pipe or a piece of earth boring equipment includes a first frame and a second frame slidably mounted on the first frame. The second frame forms a rectangular trough having an open upper end. An upwardly opening cradle rests in the open upper end of the rectangular tough of the second frame that supports the pipe or the piece of earth boring equipment. A first vertical sack mechanism is attached to a first end of the first frame and a first end of the second frame. A second vertical jack mechanism is attached to a second end of the first frame and a second end of the second frame. The first and second vertical jack mechanisms raise and lower the second frame and the upwardly opening cradle supporting the pipe or the earth boring equipment to a desired position.

28 Claims, 6 Drawing Sheets

PIPE SUPPORT SYSTEM AND METHOD FOR USE IN UNDERGROUND PIPE RAMMING

PRIORITY CLAIM AND RELATED APPLICATION DATA

This application is a divisional application of U.S. patent application Ser. No. 12/655,889 filed on Jan. 8, 2010, pending, which is a non-provisional application of U.S. provisional patent application No. 61/204,601, filed on Jan. 8, 2009. All of the foregoing applications are hereby incorporated by reference in their entirety.

FIELD OF THE INVENTION

The invention relates to an apparatus and method for positioning an underground pipe for a pipe ramming operation.

BACKGROUND OF THE INVENTION

Pipe ramming is a widely used method for installing underground metal pipes especially in large sizes such as 2+ feet in diameter. In one such process, a pneumatic impact tool engages one end opening of the pipeline and forces it through the ground either horizontally or on a vertical grade that departs from horizontal. Wentworth U.S. Pat. No. 5,505,270, Apr. 9, 1996, exemplifies a pneumatic impact tool preferred for use in pipe ramming of large diameter iron and steel pipes and is incorporated by reference herein. Pipe lengths of up to 40 feet are rammed into the ground after which a further pipe section is welded to the exposed end of the installed pipe, and the ramming tool is then relocated to the exposed end of the new pipe section, after which ramming is resumed. To move the impact tool and pipe sections, the arm of an excavator is typically used to raise and lower components into place.

In the event a vertical grade is to be maintained, current practice uses boards or beams inserted underneath the pipe section being rammed, with wedges hammered into place by hand in order to angle the pipe section as needed. This is a difficult and laborious process and is limited in the scope of changes in vertical grade (up/down) and horizontal grade (left/right) that can be made. The present invention seeks to improve on this procedure.

SUMMARY OF THE INVENTION

A skid according to the invention includes a frame which is supported on the ground at the work site. A cradle assembly is mounted on the frame. The cradle assembly includes a cradle suitable for supporting a pipe section by its outer surface and a trough or second frame in which the cradle is slidingly disposed. A vertical jack mechanism is provided on the frame for raising and lowering the cradle assembly, and a horizontal jack mechanism is provided in the second frame for sliding the cradle back and forth. The jack mechanisms are preferably hydraulic cylinders. In a preferred embodiment, a pair of vertical hydraulic cylinders are provided at opposite ends of the frame, which cylinders are connected to opposite ends of the trough or second frame so that the cradle assembly can move up and down within a range of positions determined by the length of the hydraulic pistons.

According to a method of the invention, a series of skids of the invention are positioned in spaced locations, preferably parallel to one another, to support a pipe section during pipe ramming. A minimum of two skids are used, one each to support the front and rear of the pipe section, and if needed in view of pipe length, a third skid supports the pipe section at its middle. The vertical jacks of the skid mechanisms are operated to raise or lower the cradle assembly and pipe section as needed to achieve a desired position and grade. This is preferably done after a pipe section has been placed on the cradles of the skids, since the weight of the pipe section is likely to cause settling of the skids. If the pipe section needs to be inserted at a desired horizontal angle, one or more of the second hydraulic cylinders are operated to change the side to side angle at which the pipe section is to be inserted at. These and other aspects of the invention are described further in the detailed description which follows.

DETAILED DESCRIPTION OF THE INVENTION

Figure 1:
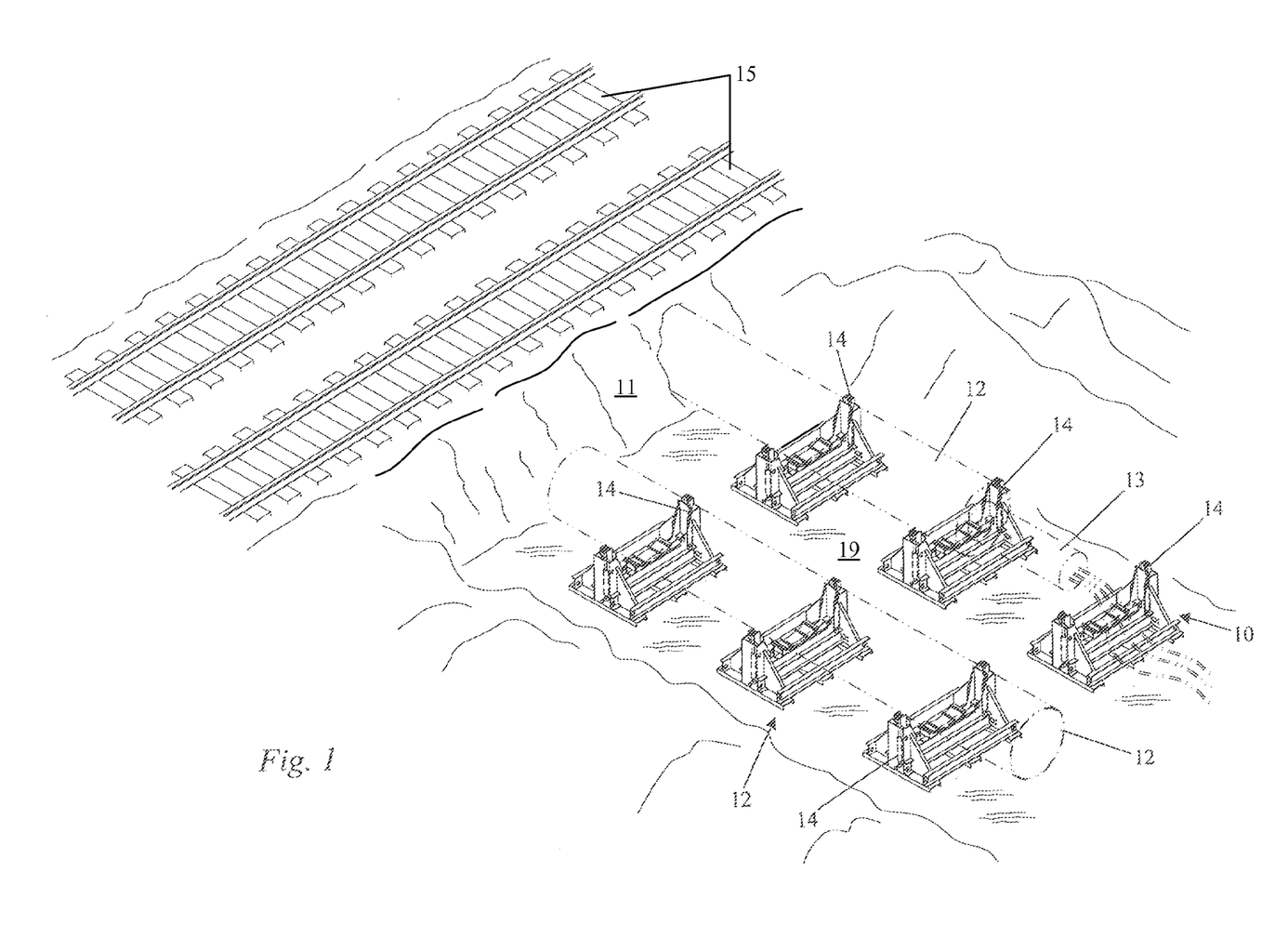
FIG. 1 is a perspective side view of a pipe support system of the invention.

Referring to FIG. 1, the present invention provides an apparatus 10 having two or more skids 14 that support and position large ductile pipes or pipe sections 12 (such as iron or steel pipe that may range from 12 inches to 160 inches in diameter and be any range of lengths, from 5' to 180') during a pipe ramming operation during which a ramming tool 13 such as a pneumatic impact rammer engages the pipe 12 at its rear end and is operated to push the pipe 12 progressively into the ground. This compares with the known method wherein pipe sections lying on the ground of an earthen entry ramp are supported by H-beams or boards and the like at front and rear. According to the invention, before moving the first pipe section 12 into place for ramming, a series of skids 14 are placed in the entry zone 19 in spaced positions preferably along a line perpendicular to the entry surface 11, generally a vertical dirt wall, such as along the side of a railroad track bed 15, highway, canal, or under a building, as shown in FIG. 1, but the starting position could define an acute angle relative to the entry surface 11 in either or both of the up-down and side to side directions.

In a preferred form of the invention, at least three skids 14 are provided, one at or near the front end of the pipe section 12, one at or near the rear end, and the third at a central position preferably equally spaced from the others. Three skids 14 are typical for a 40' long, 3' diameter pipe section 12. In some cases four or more skids 14 are used, two at the ends and the others at a series of intermediate positions as needed to support and guide the pipe 12 being rammed. The ramming tool 13 is mounted in the rear end of the pipe section 12 and may benefit initially from being supported from beneath by a skid 14 according to the invention if available. Once the bore is under way, the ramming tool 13 is suspended vertically by its engagement with the rear end opening of the pipe 12.

Deployment of the system of the invention is carried out with relative ease. The skids 14 are lowered into the desired positions using a crane or excavator arm. The position of the pipe 12 is adjusted as needed using the skids 14 as described hereafter.

Figure 2:
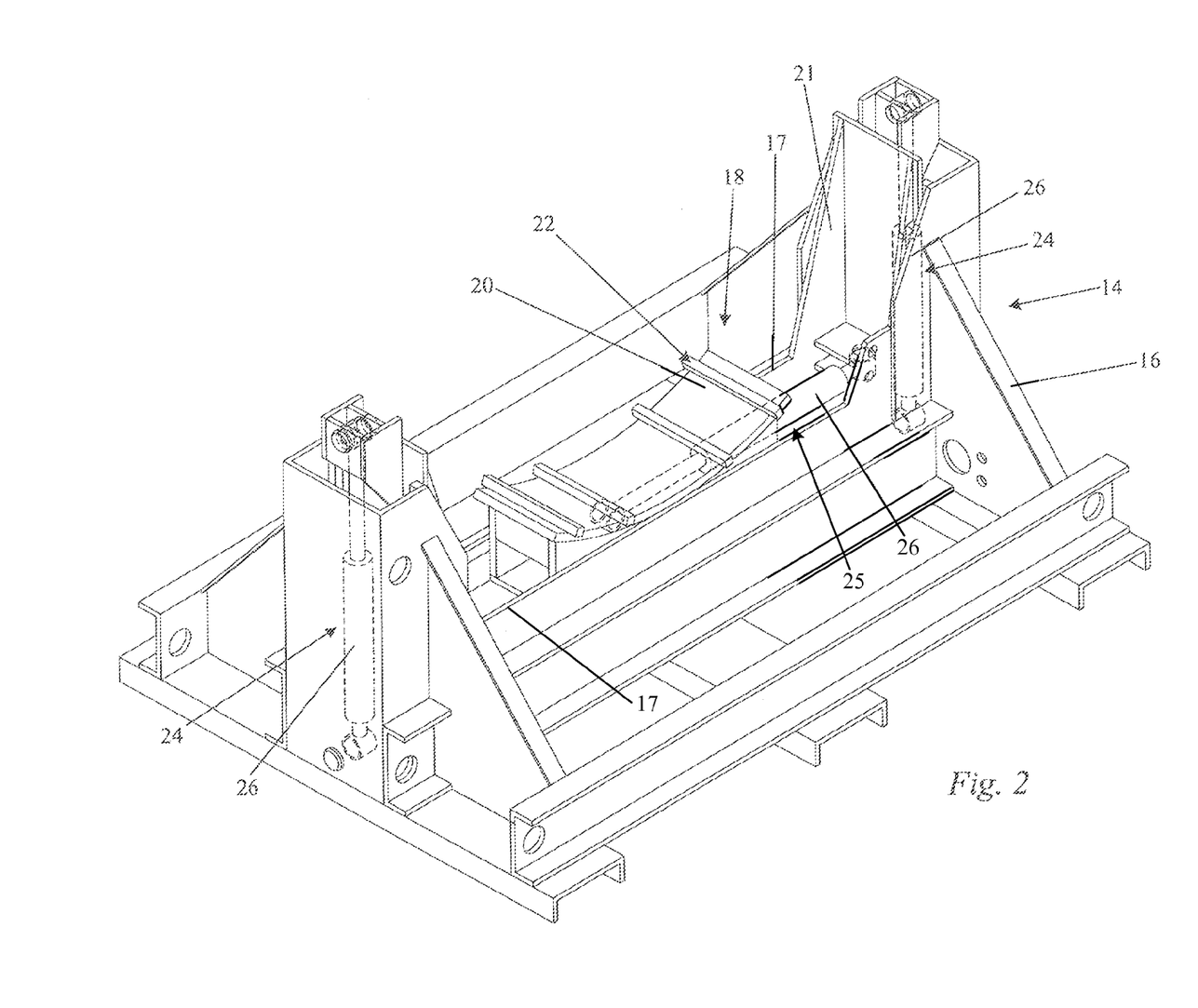
FIG. 2 is a perspective side view of a skid used in FIG. 1.
Figure 3:
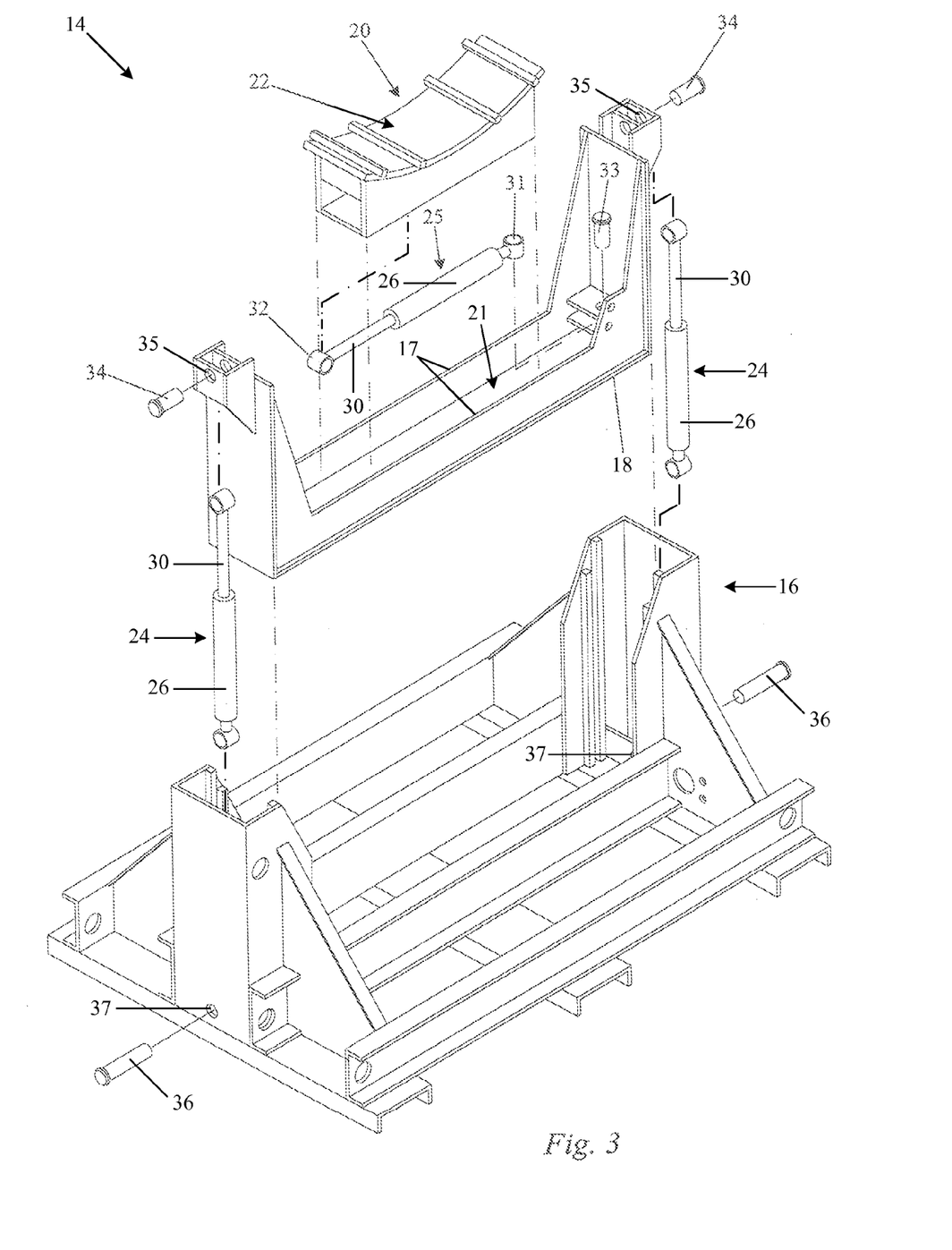
FIG. 3 is an exploded view of the pipe support system of FIGS. 1-3.
Figure 4:
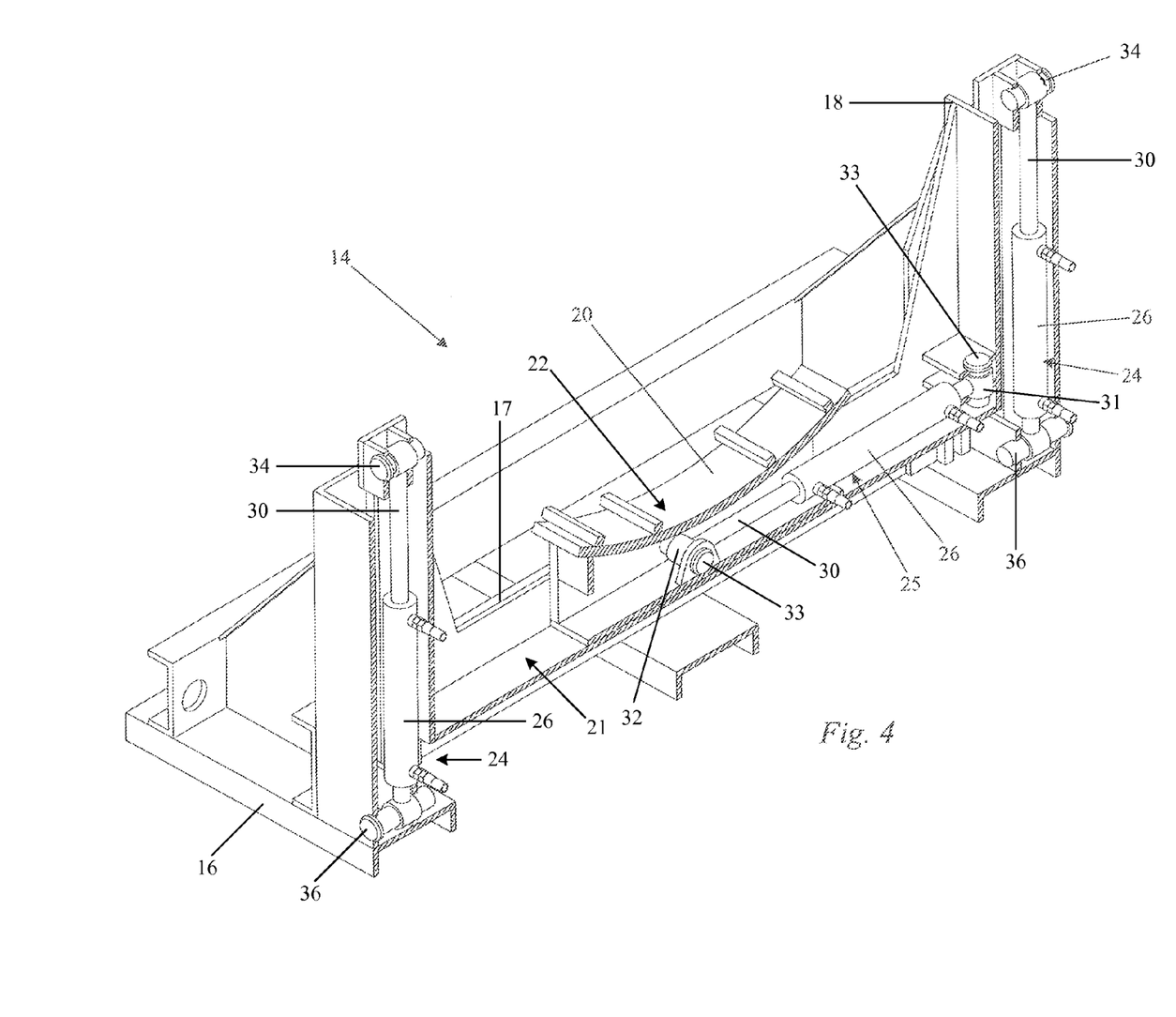
FIG. 4 is a lengthwise sectional view of the pipe support system of FIGS. 1-3.

Referring to FIGS. 2-4, each pipe skid 14 includes a stationary frame 16 that is positioned transversely or approximately so to the line along which the skids are set, i.e., in the lengthwise direction of pipe 12 in its starting position. The frame 16 has a movable frame 18 mounted therein which movable frame 18 supports a cradle 20 shaped to support the rounded external surface of pipe 12. Cradle 20 is mounted for sliding movement along upper edges of a pair of side panels 17 of frame 18. Frame 18 forms a rectangular trough 21 made from welded steel plates. Cradle 20 rests in the open upper end of trough 21.

Cradle 20 preferably has an upwardly opening concave or U-shaped surface 22. A rounded profile of a curvature equal or close to that of the pipe to be supported is preferred on surface 22 for ease of use.

Skid 14 further includes a pair of vertical hydraulic jack mechanisms 24 for raising and lowering the frame 18 and cradle 20 at opposite ends as well as pipe 12 supported thereon. Vertical jack mechanisms 24 are provided at opposite ends of frame 18 so that frame 18 and cradle 20 can be raised and lowered evenly. Each vertical jack mechanism 24 comprises a hydraulic cylinder 26 as shown in FIGS. 2-4. In addition to supporting pipe 12 at a desired height, vertical jack mechanisms 24 can be used to change the grade angle of pipe 12 as it is being driven into the ground by raising or lowering one end of pipe 12.

A horizontal hydraulic jack mechanism 25 is mounted in trough 21 of moveable frame 18 for moving cradle 20 horizontally back and forth in the lengthwise direction of the frame 18. Horizontal jack mechanism 25 is connected to frame 18 at its near end 31 and to cradle 20 at its far end 32 by means of pins 33. In this embodiment both the vertical and horizontal jack mechanisms 24 and 25 are powered by a hydraulic power pack comprised of a gas, electrical, or diesel motor mounted onto a hydraulic pump system to pump fluid to the valves and into the cylinders 26. Moving the rod 30 of hydraulic cylinder 26 in horizontal jack mechanism 25 back and forth causes the cradle 20 to move horizontally inside the trough 21, sliding in its lengthwise direction. This action is used to redirect the angle at which pipe 12 is driven in a horizontal plane.

As shown, it is preferred that a pair of vertical hydraulic jack mechanisms 24 are provided at opposite ends of frame 18 so that cradle 20 may be raised and lowered evenly.

The rods 30 of the cylinders 26 of vertical jack mechanisms 24 are attached by pins 34 to the moveable frame 18 via apertures 35 and pins 36 to the stationary frame 16 via apertures 37, whereby extending rods 30 of the vertical jack mechanisms 24 raise trough 21 together with cradle 20 and pipe 12 supported by cradle 20. Valving is provided at the hydraulic power pack so that the hydraulic cylinders 26 of vertical jack mechanisms 24 of each skid 14 operate simultaneously in the same direction, gently raising or lowering the cradle 20. When the cradle 20 is supporting a pipe 12, the pipe 12 at that location can be either raised or lowered, or pushed or pulled to one side by the horizontal tilting mechanism embodied in horizontal jack mechanism 25. Pneumatic cylinders could also be used for the vertical jack mechanism 24 and 25 instead of hydraulic cylinders 26 depending on the weight to be supported.

The cylinders 26 of each jack mechanism 24 and 25 are connected to a hydraulic power pack (not shown) which has control levers for operating each cylinder 26, two levers per skid 14, six total in the example wherein three skids 14 are provided to support each pipe 12. One lever of each pair operates the cylinders 26 of the vertical jack mechanisms 24 and the other level operates the cylinder 26 of the horizontal jack mechanism 25 which moves the cradle horizontally. It will be understood that terms such as horizontal and vertical as used herein do not imply extreme precision, and in many cases refer to approximately horizontal or vertical ("upright") positions. It is a strength of the present invention that the skids do not have to be placed on level ground; differences in elevation can be compensated for by adjusting the position of the cradle. The pair of cylinders that control vertical and horizontal movement of the cradle 20 are valved to operate in tandem when both of the corresponding control levers have been manually moved. A vertical grade is achieved by having one end of the pipe section 12 at a different elevation than the other.

In typical operation, once the skids 14 are positioned as desired, the end (front and rear) pair of cradles 20 are raised vertically to position the pipe correctly on the desired grade and alignment. The pipe section 12 is then set down with its centerline on the skids 14 and along the boring line defined by an imaginary line connecting the centers of the cradles. The center cradle if present is then raised to match the grade and alignment of the pipe for starting the pipe ramming operation. The ramming tool 13 is then lowered into proximity with the open rear end of the pipe section 12, and the nose of the tool 13 is engaged in the open rear end of the pipe section 12, after which ramming can begin by supplying compressed air to the impact ramming tool 13. A pipe ramming adapter may be interposed between the rear end of the pipe section 12 and the nose of the ramming tool 13.

To angle the pipe section 12 from side to side, the preferred procedure is to drop the center cradle(s) 20 and then actuate the second (horizontal) cylinder to achieve the desired alignment. It is possible to actuate the cylinders 26 for the front and rear skids at the same time in opposite directions to skew the pipe section right or left.

When the pipe section is driven in all the way, the cradles 20 of the skids 14 are maintained in their present position to receive the next section of pipe in the same desired grade and alignment. The front end of the new pipe section is welded to the rear end of the one preceding it, and the ramming tool is positioned in the open rear end of the new pipe section. The ramming tool 13 is then run so that the pipe string including both pipe sections 12 and any sections 12 added earlier are rammed into the ground. The process is repeated until the bore is completed, after which the tool and skids, along with the hydraulic power pack, are loaded onto a truck for transport or lifted to a new work site a short distance away.

It will be understood that the foregoing description is of preferred exemplary embodiments of the invention, and that the invention is not limited to the specific forms described and illustrated. Modifications may be made without departing from the spirit of the invention as expressed in the appended claims.

Figure 5:
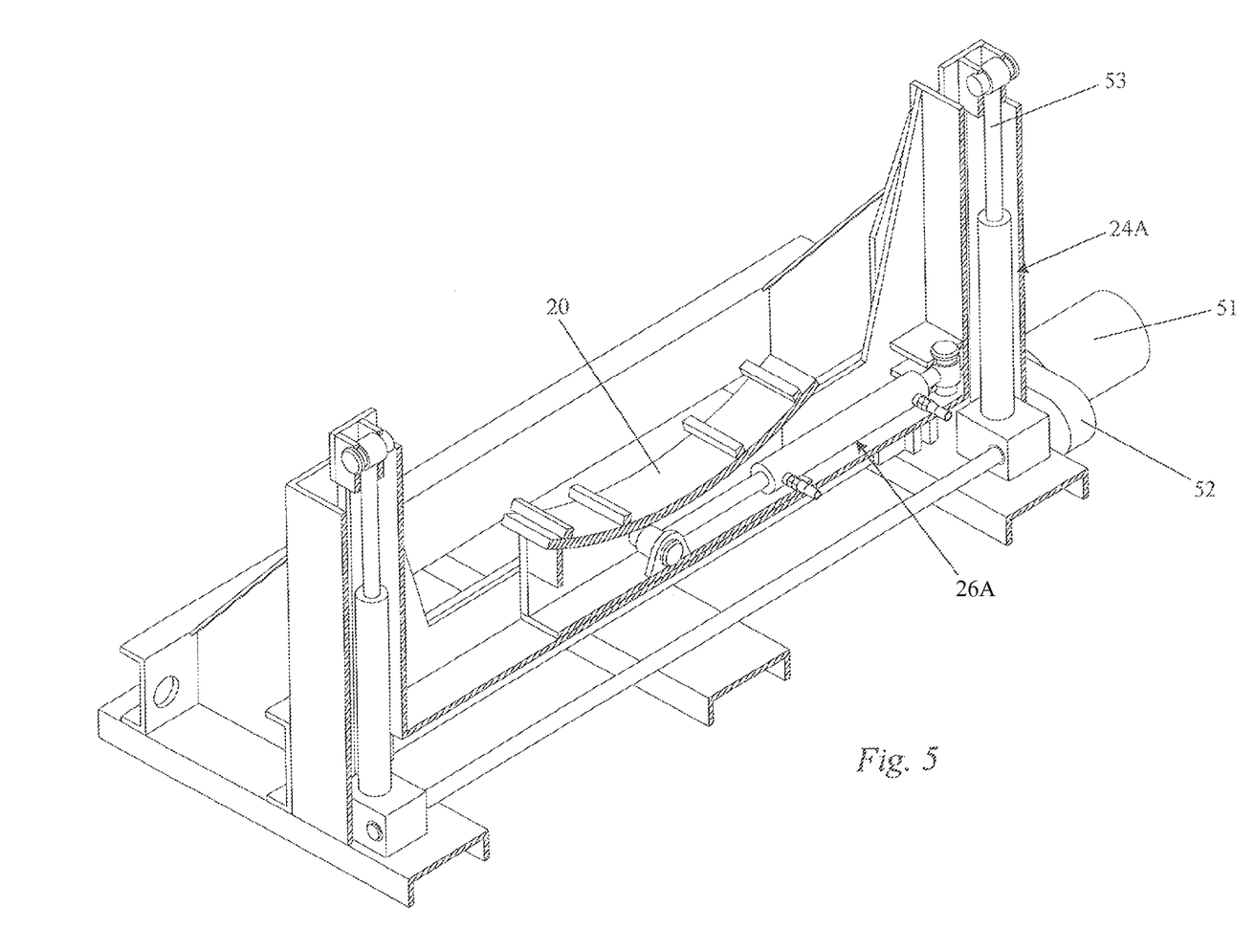
FIG. 5 is a perspective view partly in section of an alternative cradle assembly of the invention using an electric motor.
Figure 5A:
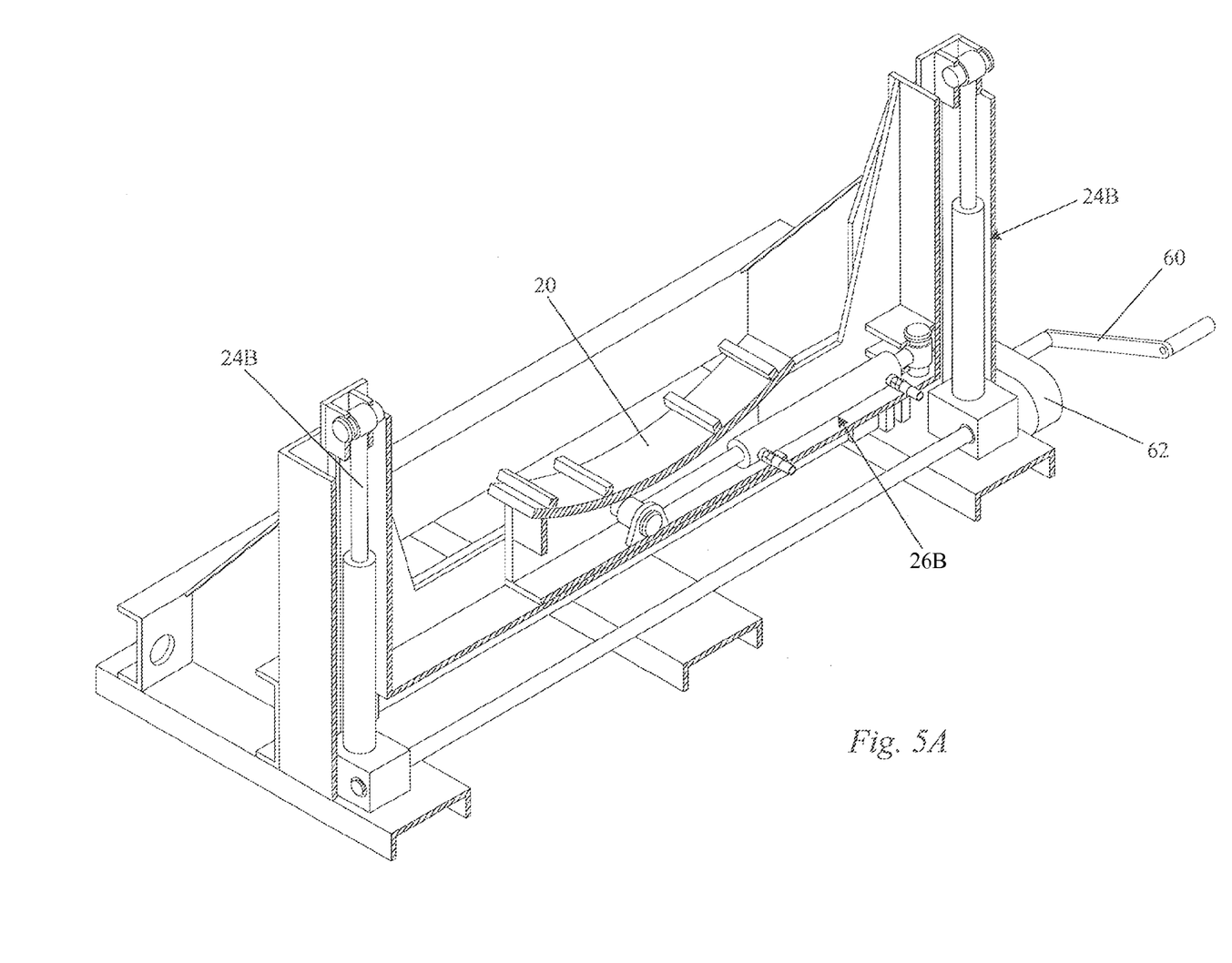
FIG. 5A is a perspective view partly in section of a further embodiment wherein the vertical jack assembly is manually actuated.

For example, the cylinder located on the second frame could be omitted if no means of sliding the cradle horizontally is needed, or a purely mechanical system such as shown in FIG. 5A could replace any of the powered jacks described. In FIG. 5, for example, an electrically driven system is used to provide electrically powered jacks 24A and 26A that function for the same purpose as the hydraulic jacks 24 and 26. In the example shown, an electric motor 51 is connected to a gear box 52 so that a rack and pinion connection can be used to extend and retract a shaft 53 in a vertical direction to raise and lower cradle 20. Actuation of the horizontal jack can likewise substitute an electrically powered cylinder.

FIG. 5A shows a further alternative wherein the electric motor is replaced by a manual hand crank 60 and a gearbox 62 whereby the vertical jack 24B is raised and lowered manually depending on the direction of rotation of crank 60. Horizontal jack 26B may also be operated manually in a similar fashion. The apparatus of the invention can be used for stabilizing other items or devices on the ground, for example a horizontal cable pulling machine used in earth boring.

What is claimed is:

1. A skid for positioning a pipe or a piece of earth boring equipment comprising:
    a first frame;
    a second frame slidably mounted on the first frame, the second frame forming a rectangular trough having an open upper end;
    an upwardly opening cradle resting in the open upper end of the rectangular tough of the second frame that supports the pipe or the piece of earth boring equipment;
    a horizontal jack mechanism attached to the second frame and the upwardly opening cradle, wherein the horizontal jack mechanism moves the upwardly opening cradle in a horizontal direction;
    a first vertical jack mechanism attached to a first end of the first frame and a first end of the second frame;
    a second vertical jack mechanism attached to a second end of the first frame and a second end of the second frame; and
    the first and second vertical jack mechanisms raise and lower the second frame and the upwardly opening cradle supporting the pipe or the earth boring equipment to a desired position.

2. The skid of claim 1, wherein the first and second jack vertical mechanisms each comprise a hydraulic cylinder.

3. The skid of claim 1, wherein the desired position is a level position above a ground.

4. The skid of claim 1, wherein the skid is positioned in a hole.

5. The skid of claim 1, wherein:
    the first vertical jack mechanism is mounted within a first three-sided column on the first end of the first frame and attached to a lower portion of the first three-sided column;
    the second vertical jack mechanism is mounted within a second three-sided column on the second end of the first frame and attached to a lower portion of the second three-sided column;
    the first end of the second frame extends into an open side of the first three-sided column and the first vertical jack mechanism is attached to an upper portion of the first end of the second frame; and
    the second end of the second frame extends into an open side of the second three-sided column and the second vertical jack mechanism is attached to an upper portion of the second end of the second frame.

6. The skid of claim 1, wherein each vertical jack mechanism is hydraulically operated, electrically operated or manually operated.

7. The skid of claim 1, wherein the first frame stands stationary on the ground.

8. A skid for positioning a pipe or a piece of earth boring equipment comprising:
    a first frame having a first three-sided column on a first end, and a second three-sided column on a second end;
    a second frame forming a rectangular trough having an open upper end, the second frame having a first end extending into an open side of the first three-sided column and a second end extending into an open side of the second three-sided column such that the second frame is slidably mounted on the first frame;
    an upwardly opening cradle resting in the open upper end of the rectangular tough of the second frame that supports the pipe or the piece of earth boring equipment;
    a first vertical jack mechanism mounted within the first three-sided column and attached to a lower portion of the first three-sided column of the first frame and a upper portion of the first end of the second frame;
    a second vertical jack mechanism mounted within the second three-sided column and attached to a lower portion of the second three-sided column of the first frame and a upper portion of the second end of the second frame; and
    the first and second vertical jack mechanisms raise and lower the second frame and the upwardly opening cradle supporting the pipe or the earth boring equipment to a desired position.

9. The skid of claim 8, wherein the first and second jack vertical mechanisms each comprise a hydraulic cylinder.

10. The skid of claim 8, further comprising a horizontal jack mechanism attached to the second frame and the upwardly opening cradle, wherein the horizontal jack mechanism moves the upwardly opening cradle in a horizontal direction.

11. The skid of claim 8, wherein the desired position is a level position above a ground.

12. The skid of claim 8, wherein the skid is positioned in a hole.

13. The skid of claim 8, wherein each vertical jack mechanism is hydraulically operated, electrically operated or manually operated.

14. The skid of claim 8, wherein the first frame stands stationary on the ground.

15. A system for positioning a pipe or a piece of earth boring equipment comprising:
    two or more skids that are spaced apart from one another;
    each skid comprises: (a) a first frame, (b) a second frame slidably mounted on the first frame, the second frame forming a rectangular trough having an open upper end, (c) an upwardly opening cradle resting in the open upper end of the rectangular tough of the second frame that supports the pipe or the piece of earth boring equipment, (d) a first vertical jack mechanism attached to a first end of the first frame and a first end of the second frame, (e) a second vertical jack mechanism attached to a second end of the first frame and a second end of the second frame, and (f) a horizontal jack mechanism attached to the second frame and the upwardly opening cradle of each skid, wherein the horizontal jack mechanism moves the upwardly opening cradle in a horizontal direction;
    the first and second vertical jack mechanisms raise and lower the second frame and the upwardly opening cradle of each skid to support the pipe or the earth boring equipment to a desired position.

16. The system of claim 15, wherein the first and second jack vertical mechanisms each comprise a hydraulic cylinder.

17. The system of claim 15, wherein the desired position is a level position or an angled position above a ground.

18. The system of claim 15, wherein the skids are positioned in a hole.

19. The system of claim 15, wherein:
    the first vertical jack mechanism is mounted within a first three-sided column on the first end of the first frame and attached to a lower portion of the first three-sided column;

the second vertical jack mechanism is mounted within a second three-sided column on the second end of the first frame and attached to a lower portion of the second three-sided column;

the first end of the second frame extends into an open side of the first three-sided column and the first vertical jack mechanism is attached to an upper portion of the first end of the second frame; and the second end of the second frame extends into an open side of the second three-sided column and the second vertical jack mechanism is attached to an upper portion of the second end of the second frame.

20. The system of claim 15, wherein each vertical jack mechanism is hydraulically operated, electrically operated or manually operated.

21. The system of claim 15, wherein the first frame stands stationary on the ground.

22. A system for positioning a pipe or a piece of earth boring equipment comprising:

two or more skids that are spaced apart from one another;

each skid comprises: (a) a first frame having a first three-sided column on a first end, and a second three-sided column on a second end, (b) a second frame forming a rectangular trough having an open upper end, the second frame having a first end extending into an open side of the first three-sided column and a second end extending into an open side of the second three-sided column such that the second frame is slidably mounted on the first frame, (c) an upwardly opening cradle resting in the open upper end of the rectangular tough of the second frame that supports the pipe or the piece of earth boring equipment, (d) a first vertical jack mechanism mounted within the first three-sided column and attached to a lower portion of the first three-sided column of the first frame and a upper portion of the first end of the second frame, and (e) a second vertical jack mechanism mounted within the second three-sided column and attached to a lower portion of the second three-sided column of the first frame and a upper portion of the second end of the second frame; and wherein the first and second vertical jack mechanisms raise and lower the second frame and the upwardly opening cradle of each skid to support the pipe or the earth boring equipment to a desired position.

23. The system of claim 22, wherein the first and second jack vertical mechanisms each comprise a hydraulic cylinder.

24. The system of claim 22, further comprising a horizontal jack mechanism attached to the second frame and the upwardly opening cradle, wherein the horizontal jack mechanism moves the upwardly opening cradle in a horizontal direction.

25. The system of claim 22, wherein the desired position is a level position or an angled position above a ground.

26. The system of claim 22, wherein the skids are positioned in a hole.

27. The system of claim 22, wherein each vertical jack mechanism is hydraulically operated, electrically operated or manually operated.

28. The system of claim 22, wherein the first frame stands stationary on the ground.

* * * * *